United States Patent
Zuniga et al.

(10) Patent No.: US 10,771,438 B2
(45) Date of Patent: Sep. 8, 2020

(54) CONTEXT-BASED PROTOCOL STACK PRIVACY

(71) Applicant: INTERDIGITAL PATENT HOLDINGS, INC., Wilmington, DE (US)

(72) Inventors: Juan Carlos Zuniga, Montreal (CA); Carlos Jesus Bernardos, Madrid (ES)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 279 days.

(21) Appl. No.: 15/540,457

(22) PCT Filed: Dec. 31, 2015

(86) PCT No.: PCT/US2015/068319
§ 371 (c)(1),
(2) Date: Jun. 28, 2017

(87) PCT Pub. No.: WO2016/109816
PCT Pub. Date: Jul. 7, 2016

(65) Prior Publication Data
US 2017/0374034 A1    Dec. 28, 2017

Related U.S. Application Data

(60) Provisional application No. 62/098,614, filed on Dec. 31, 2014, provisional application No. 61/169,850, filed on Jun. 2, 2015.

(51) Int. Cl.
*H04L 29/06* (2006.01)
*H04L 29/12* (2006.01)
(Continued)

(52) U.S. Cl.
CPC ...... *H04L 63/0421* (2013.01); *H04L 61/2015* (2013.01); *H04L 63/0407* (2013.01);
(Continued)

(58) Field of Classification Search
None
See application file for complete search history.

(56) References Cited

U.S. PATENT DOCUMENTS

| | | |
|---|---|---|
| 7,023,828 B2 | 4/2006 | Korus et al. |
| 7,185,204 B2 | 2/2007 | Narayanaswami et al. |

(Continued)

FOREIGN PATENT DOCUMENTS

| | | | |
|---|---|---|---|
| WO | 05/117479 | 12/2005 | |
| WO | WO-2005117479 A1 * | 12/2005 | ........... H04L 63/102 |

(Continued)

OTHER PUBLICATIONS

Anonymous, "AutoIP Configuration—TreckWiki," (Oct. 10, 2012) available at http://wiki.treck.com/AutoIP-Configuration (retrieved Mar. 7, 2016).

(Continued)

*Primary Examiner* — Joseph P Hirl
*Assistant Examiner* — Hassan Saadoun
(74) *Attorney, Agent, or Firm* — Volpe and Koenig, P.C.

(57) ABSTRACT

A method for use in a wireless transmit/receive unit (WTRU), the method comprising: selecting a privacy profile, wherein the privacy profile includes privacy and security settings for each layer of a protocol stack of the WTRU, wherein the privacy and security settings include at least one of using anonymous dynamic host configuration protocol (DHCP) signaling parameters, the anonymous DHCP signaling parameters include a hostname, using a random medium access control (MAC) address, or using a random Internet protocol (IP) address; and instructing each layer of (Continued)

the protocol stack of the WTRU with the privacy and security settings based on the selected privacy profile.

9 Claims, 7 Drawing Sheets

(51) Int. Cl.
    *H04W 12/08*         (2009.01)
    *H04W 12/00*         (2009.01)
    *H04W 12/02*         (2009.01)

(52) U.S. Cl.
    CPC ............ *H04L 63/102* (2013.01); *H04L 63/16* (2013.01); *H04L 61/6022* (2013.01); *H04W 12/02* (2013.01); *H04W 12/08* (2013.01)

(56) References Cited

U.S. PATENT DOCUMENTS

| | | | |
|---|---|---|---|
| 8,407,764 B2 | 3/2013 | Kang et al. | |
| 8,503,369 B2 | 8/2013 | Mizukoshi | |
| 8,514,777 B1 | 8/2013 | Zhao | |
| 8,824,678 B2 | 9/2014 | Ochikubo et al. | |
| 2003/0080997 A1* | 5/2003 | Fuehren | G06Q 30/02 715/744 |
| 2004/0123143 A1* | 6/2004 | Katz | H04L 29/12009 726/3 |
| 2005/0050352 A1* | 3/2005 | Narayanaswami | H04L 63/08 726/4 |
| 2008/0305766 A1 | 12/2008 | Falk | |
| 2009/0131020 A1* | 5/2009 | van de Groenendaal | H04L 63/102 455/411 |
| 2009/0313359 A1* | 12/2009 | Yeap | H04W 36/30 709/221 |
| 2010/0191837 A1 | 7/2010 | Linden et al. | |
| 2012/0213211 A1 | 8/2012 | Remaker | |
| 2014/0187200 A1 | 7/2014 | Reitter et al. | |
| 2015/0095501 A1 | 4/2015 | Candelore | |
| 2015/0118996 A1 | 8/2015 | Shaw | |
| 2015/0281167 A1 | 10/2015 | Seddon | |

FOREIGN PATENT DOCUMENTS

| | | |
|---|---|---|
| WO | 12/015902 | 2/2012 |
| WO | 14/032049 | 2/2014 |

OTHER PUBLICATIONS

Anonymous, "Random Mac Address and Hostname at Boot with Ubuntu," A Critique of Planet Earth, pp. 1-4 (Nov. 14, 2013) available at https://acritiqueofplanetearth.wordpress.com/2013/11/14/6 (retrieved Mar. 7, 2016).

Apple Support, "Using network locations (Mac OS X v10.6 and later)" (Aug. 28, 2009).

Chirgwin, "MAC address privacy inches towards standardization," available at http://www.theregister.co.uk/2015/06/26/mac_address_privacy_inches_towards_standardisation/ (Jun. 26, 2015).

Draves et al., "Default Router Preferences and More-Specific Routes," Network Working Group, RFC 4191 (Nov. 2005).

Gont et al., "Deprecating EUI-64 Based IPv6 Addresses," IPv6 maintenance Working Group (6man), Internet-Draft (Oct. 22, 2013).

Gont, "A Method for Generating Semantically Opaque Interface Identifiers with IPv6 Stateless Address Autoconfiguration (SLAAC)," Internet Engineering Task Force (IETF), RFC 7217 (Apr. 2014).

Huitema et al., "Anonymity profile for DHCP clients," Network Working Group, Internet-Draft (Aug. 20, 2015).

Huitema, "Experience with MAC Address Randomization in Windows 10," IETF 93, Prague (Jul. 2015).

Huitema, "Implications of Randomized Link Layers Addresses for IPv6 Address Assignment," Network Working Group, Internet-Draft (Aug. 17, 2015).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

Location Based Settings Management for Android (2011).

Misra, "iOS8 MAC Randomization—Analyzed!," available at http://blog.airtightnetworks.com/ios8-mac-randomization-analyzed/ (Sep. 23, 2014).

Moskowitz et al., "Host Identity Protocol (HIP) Architecture," Network Working Group, RFC 4423 (May 2006).

Narten et al., "Privacy Extensions for Stateless Address Autoconfiguration in IPv6," Network Working Group, RFC 4941 (Sep. 2007).

O'Donoghue, "Edward Snowden Highlights Identity and Privacy at IETF 93," available at https://www.internetsociety.org/blog/2015/07/edward-snowden-highlights-identity-and-privacy-at-ietf-93/ (Jul. 21, 2015).

O'Grady," iOS 8 randomizes MAC addresses," available at http://www.zdnet.com/article/ios-8-randomizes-mac-addresses/ (Jun. 11, 2014).

Profile Flow—Android Apps on Google Play (Oct. 13, 2013).

Softlayer, "About Control Plane," Control Plane: Context Sensitive Computing available at https://web.archive.org/web/20140204004253/http://www.controlplaneapp.com:80/about/ (Feb. 4, 2014).

Stapp et al., "The Dynamic Host Configuration Protocol (DHCP) Client Fully Qualified Domain Name (FQDN) Option," Network Working Group, RFC 4702 (Oct. 2006).

Symonds, "MarcoPolo: Context-aware computing for Mac OS X," (2006-2007).

Thomson et al., "IPv6 Stateless Address Autoconfiguration," Network Working Group, RFC 4862 (Sep. 2007).

Yu, "IEEE Announces Successful Wireless Privacy Trials at IETF and IEEE 802® Meetings," available at http://standards.ieee.org/news/2015/wireless_privacy_trials.html (Jun. 24, 2015).

\* cited by examiner

CONTEXT-BASED PROTOCOL STACK PRIVACY

CROSS REFERENCE TO RELATED APPLICATIONS

This application is the U.S. National Stage, under 35 U.S.C. § 371, of International Application No. PCT/US2015/068319 filed Dec. 31, 2015, which claims the benefit of U.S. provisional application No. 62/098,614, filed Dec. 31, 2014 and U.S. Provisional Application Ser. No. 62/169,850 filed Jun. 2, 2015, the content of which are hereby incorporated by reference herein.

BACKGROUND

Privacy is becoming a major industry concern as more wireless transmit/receive units (WTRUs) are connected directly or indirectly to the Internet. Ubiquitous connectivity, together with poorly secured protocol stacks and a lack of privacy education of many users makes it easy to track/monitor the location of users and/or eavesdrop on the users' activity. Many factors contribute to this phenomenon, such as the vast digital footprint that users leave on the Internet (e.g., sharing information on social networks, cookies used by browsers and servers to provide a better navigation experience, connectivity logs that allow the tracking of a user's layer-2 (L2) or layer-3 (L3) address, and the like) and/or weak (or even null in some cases) authentication and encryption mechanisms used to secure communications.

Internet privacy has also become an important topic after several recent incidents of widespread and pervasive Internet surveillance have been revealed. Users have become aware of the fact that their communications, habits, and routines may be followed without their consent by different commercial, criminal, and governmental organizations. This issue has created mistrust of the Internet and may affect the acceptance of Internet technology.

For example, a device, and its associated owner, may be tracked by observing the device's Layer-2 (L2) and/or Layer-3 (L3) address communications. L2 addresses may be observed by a third party. The third party may be the operator of the access infrastructure, a passive device listening to communications in the same network, for example over-the-air transmissions performed by 802.11 Wi-Fi devices, and the like. In an 802.11 network, a station (STA) may expose its L2 address in various situations. For example, when a STA is associated with an access point (AP), the L2 address is used in frame transmission and reception, as one of the addresses used in the address fields of an 802.11 frame. In another example, when a STA actively scans for available networks, the L2 address is used in probe request frames sent by the STA.

Traditional L3 address assignment techniques, such as the Internet Protocol version 6 (IPv6) stateless auto-configuration techniques (SLAAC), generate the interface identifier (IID) of the address from its L2 address (via the 64-bit Extended Unique Identifier (EUI-64)), which then becomes visible to all peers with an active IP communication. This visible IID allows for the tracking of a device at L3. The prefix part of the address may also generally provide the physical location of the device, which together with the L2 address-based IID, allows for global device tracking.

Privacy cannot be completely provided by a single communication layer in isolation, as open hooks in other layers may affect the user's privacy overall. The use of temporary addresses, opaque IIDs or even the use of random L2 addresses (as some operating systems do when performing active scanning), may partially mitigate the privacy threat, however these techniques do not completely address all privacy issues.

Privacy concerns affect all layers of the protocol stack, from the lower layers involved in actual access to the network (e.g., the L2/L3 addresses can be used to obtain the location of a user) to the application layers, especially when browsing or getting involved with social networks (e.g., cookies may be used to find out the identity of a user accessing a particular webpage or website).

SUMMARY

A method for use in a wireless transmit/receive unit (WTRU) for configuring a privacy protocol stack profile, including private addresses for the WTRU is described herein. The WTRU may determine if it is in an unknown or untrusted location and may set a profile of the WTRU to public network, and may set the MAC and IP addresses and other protocol identifiers to random, opaque and non-persistent. Alternatively, the WTRU may determine it is in a known and trusted location and may set a profile of the WTRU to home or office. The WTRU may then set the MAC and IP addresses and other protocol identifiers to permanent and well-known values. Alternatively, the WTRU may determine it is at an untrusted but known network where a persistent identifier is required. The WTRU may set a profile of the WTRU to authenticated hotspot and may set the MAC and IP addresses, and other protocol identifiers, to random, opaque but persistent.

The method also includes receiving information about neighboring networks by a privacy manager. The privacy manager may then determine privacy profile options based on the context of the neighboring networks, location, etc. The privacy manager may then display available privacy profile options based on the determination. The privacy manager may then receive a selection of a profile, which may be sent via a user input or a network policy. The privacy manager may then instruct each layer of a protocol stack with privacy and security settings based on the selected privacy profile. Alternatively, the privacy manager may select the privacy profile based on a policy.

BRIEF DESCRIPTION OF THE DRAWINGS

A more detailed understanding may be had from the following description, given by way of example in conjunction with the accompanying drawings wherein.

DETAILED DESCRIPTION

Figure 1A:
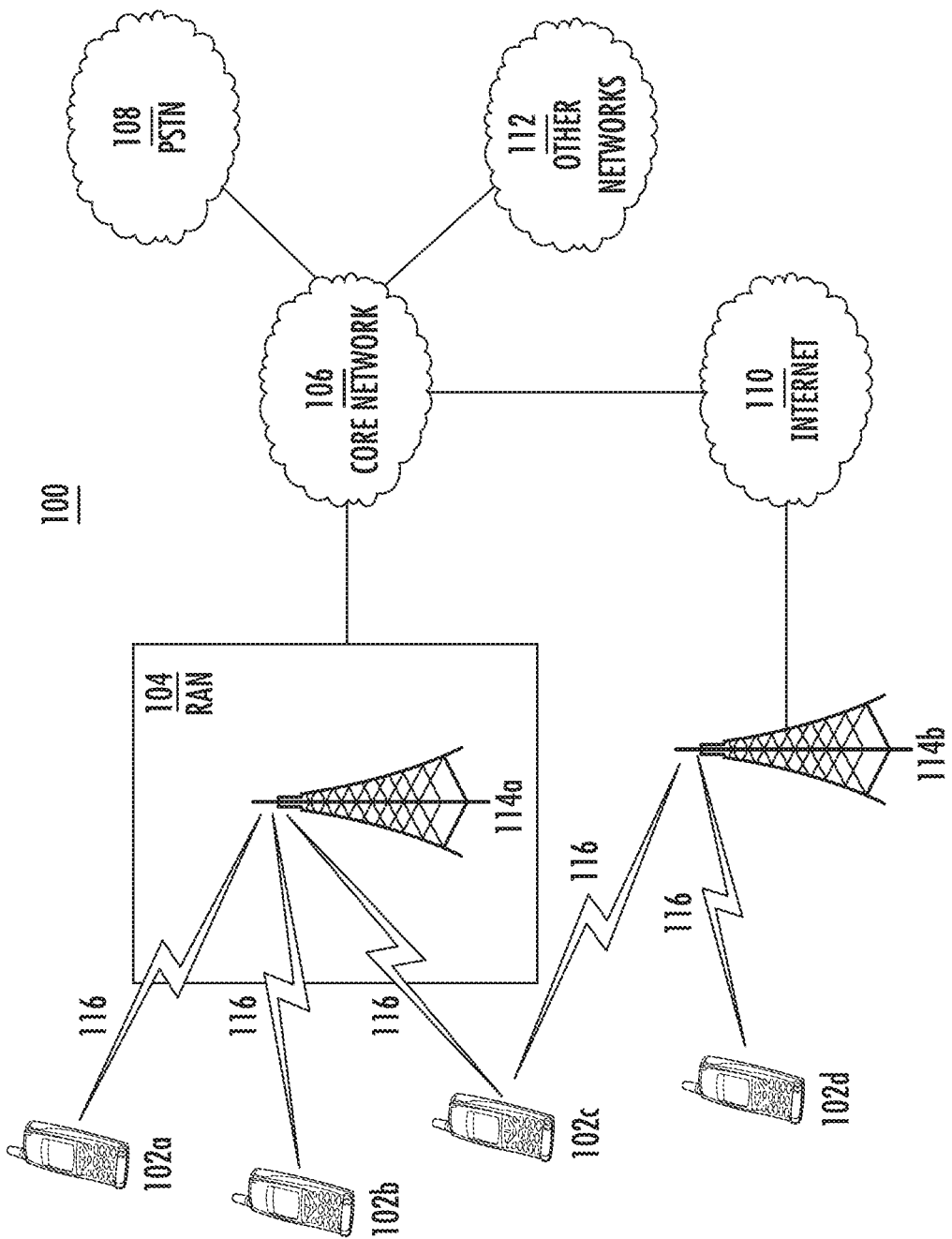
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer (PC), a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
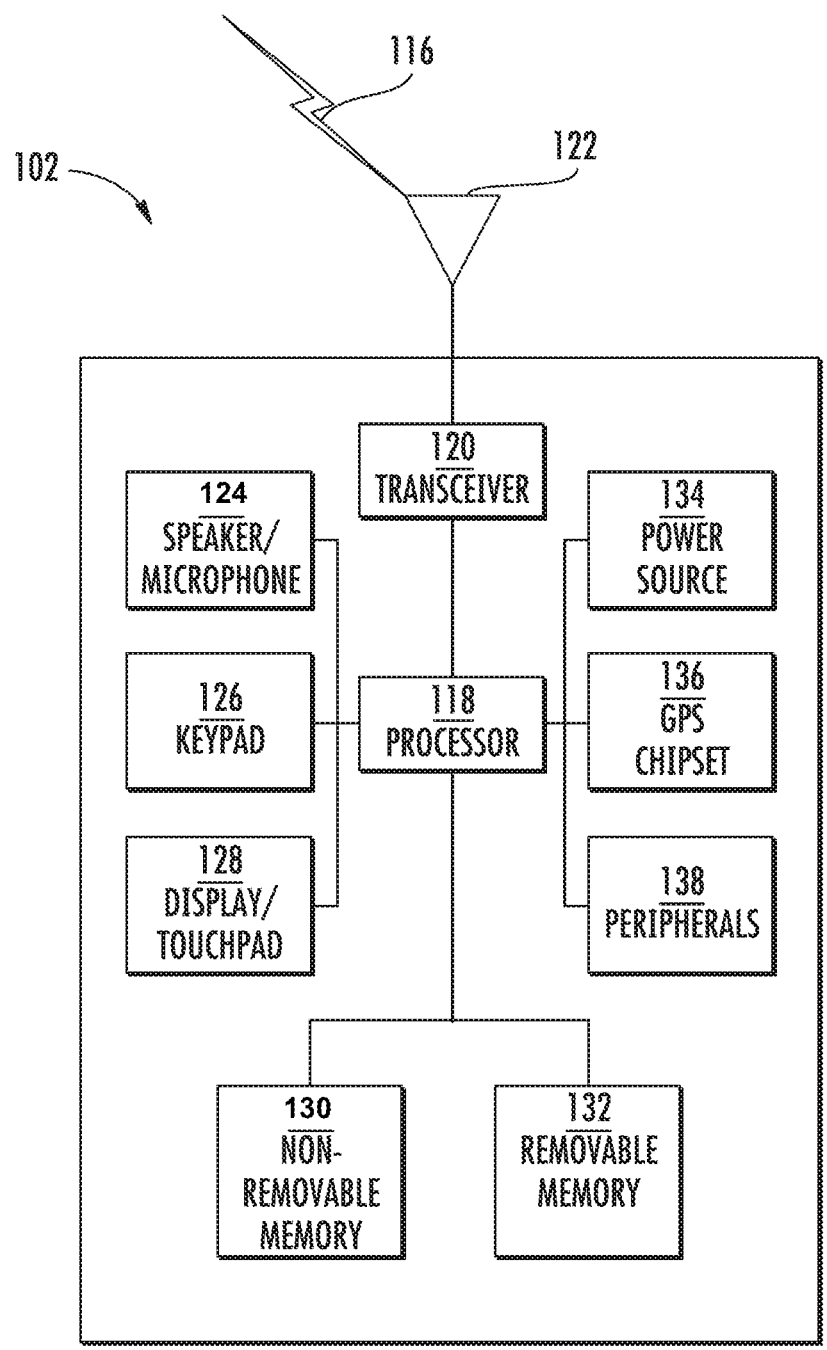
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

Figure 1C:
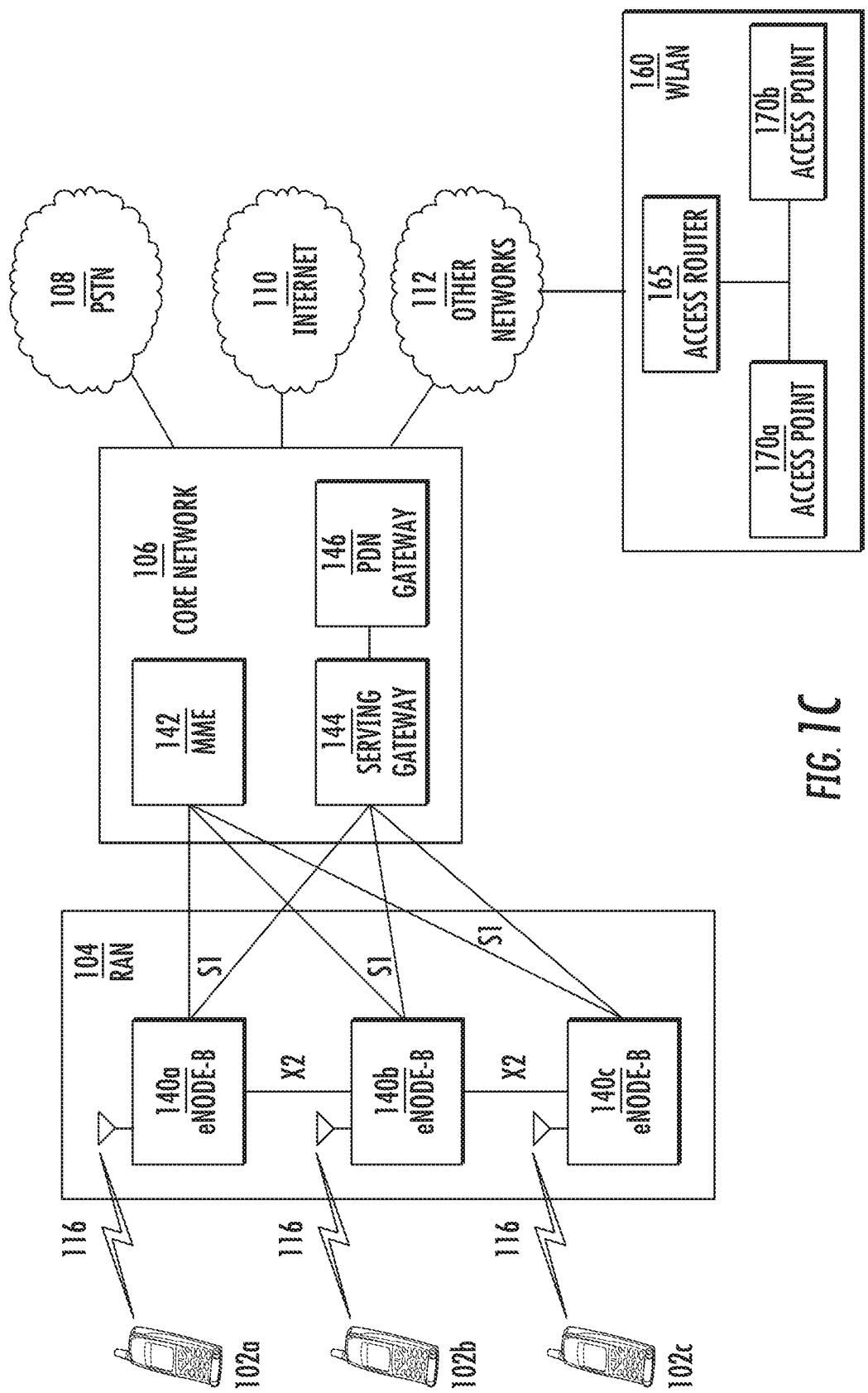
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

The methods and apparatuses described hereinafter may be deployed in a network as described above, or any other network known to one of skill in the art. As used in the embodiments described hereinafter, a WTRU may include, but is not limited to, a STA, an AP, a laptop PC, a smartphone, a server, or other communication device capable of operating in a network.

Privacy techniques, such as those set forth in request for comment (RFC) 4191 and RFC 7217, work in a non-coordinated fashion, which limits the effectiveness of these privacy techniques. Generally, privacy should be tackled at all layers to avoid privacy information leaking. Privacy techniques should also be flexible, allowing for automatic, pseudo-automatic, or manual privacy protection activation. In some cases, a permanent address may be required, for example due to operational operations (e.g. address-based authentication, access control lists, and the like). Therefore, privacy techniques should allow for enabling and disabling the use of privacy mechanisms depending of the context, such as the location of the device or the characteristics of the network where the device is attaching.

RFC 4191, entitled Privacy Extensions for Stateless Address Auto-configuration in Internet Protocol version 6 (IPv6), identifies and describes the privacy issues associated with embedding L2 stable addressing information into IPv6 addresses (as part of the IID). RFC 4191 also describes some mechanisms to mitigate the associated problems. RFC 4191 is meant for IPv6 nodes that auto-configure IPv6 addresses based on the L2 address (EUI-64 mechanism).

RFC 4191 also defines how to create additional addresses (generally known as temporary addresses) based on a random interface identifier for the purpose of initiating outgoing sessions. These random or temporary addresses are meant to be used for a short period of time (e.g. minutes, hours, or days) and are then deprecated. Deprecated addresses may continue to be used for already established connections but are not used to initiate new connections. New temporary addresses may be generated periodically to replace temporary addresses that expire. In order to do so, a node may produce a sequence of temporary global scope addresses from a sequence of interface identifiers that appear to be random in the sense that it is difficult for an outside observer to predict a future address (or identifier) based on a current one, and it is difficult to determine previous addresses (or identifiers) knowing only the present one.

Temporary addresses should generally not be used by applications that listen for incoming connections (as these applications are generally waiting on permanent/well-known identifiers). If a node changes networks and comes back to a previously visited one, the temporary addresses that the node would use may be different, and this may be an issue in certain networks where addresses are used for operational purposes (e.g. filtering or authentication in a corporate network, or access to a paying network where access has been purchased for a certain time as done in some hotels).

RFC 7217, entitled a Method for Generating Semantically Opaque Interface Identifiers with IPv6 Stateless Address Auto-configuration (SLAAC) describes and defines a method for generating IPv6 IIDs to be used with IPv6 SLAAC, such that an IPv6 address configured using this method is stable within each subnet, but the corresponding IID changes when the host moves from one network to another. This method is meant to be an alternative to generating Interface Identifiers based on L2 addresses, such that the benefits of stable addresses may be achieved without sacrificing the security and privacy of users.

The method defined to generate the IPv6 IID is based on computing a hash function, which takes as input information that is stable and associated to the interface (e.g. L2 address or local interface identifier), stable information associated to the visited network (e.g., IEEE 802.11 SSID), the IPv6 prefix, and a secret key, plus some other additional information. This generally ensures that a different IID is generated when any of the input fields change (such as the network or the prefix), but that the IID is the same within each subnet.

RFC 4423, entitled Host Identity Protocol (HIP) Architecture, proposes a new host identity namespace, and a new protocol layer, being the HIP, between the internetworking and transport layers, which inherently provides some privacy features. However, this protocol has not seen market adoption and the potential to make it widely used for Internet communications is minimal.

L2 address randomization is one example privacy feature. The Institute of Electrical and Electronics Engineers (IEEE) 802 addressing includes one bit to specify if the hardware address is locally or globally administered. This allows generating local addresses without any global coordination mechanism ensuring that the address is unique. This feature may be used to generate random addresses and therefore may make a user device more difficult to be tracked from its L2 address. This feature is partially being used by some devices. These devices may be enabled to use random addresses during active WiFi probe scanning.

L2 address randomization is a powerful tool that may become an industry standard to make user tracking more difficult. However, as it has to be selectively enabled/disabled, a default "always on" or "always off" policy may not be enough. For example, many networks use L2 address access filtering as part of their security policy or use it to identify allowed users in a public hotspot (i.e. once the user provides the required credentials on a captive portal, an L2 address may be used to identify and authorize the user). In this scenario, L2 address randomization may have to be performed more carefully.

Methods may be used to mitigate and/or tackle some privacy and/or security threats. However, there is also a need for the coordination of different actions taken at different layers in the protocol stack. This is because privacy is a global issue, and as such, it is hard to solve this issue by tackling it locally at different layers without proper coordination among them. For example, it may not be enough to only randomize L2 addresses, as L3 addresses and identifiers, such as the ones used by dynamic host configuration protocol (DHCP), might also disclose information allowing an attacker to find out the user's location and identity. Another example is the use of cookies, which may be disabled to avoid unwanted user profiling.

There is also a need for flexibility and dynamic adaptation. For example, a policy that involves L2/L3 address randomization may be appropriate when connecting to a public untrusted network, but might not be appropriate when the user is accessing a corporate network. Similarly, using and storing HTTP cookies may be suitable on certain sites (or when browsing logged in by a certain account) but may not be for others.

There is also a need for enhanced configurability. For example, privacy and security mechanisms may be configurable and customizable, taking into account multiple inputs, such as user's preferences, WTRU administrator preferences, network context, geo location, and the like. These inputs may imply different actions regarding how to configure the protocol stack to provide privacy. For example, the user may want to enable L2/L3 randomization when connecting to every network using their corporate laptop, but an administrator of the corporate laptop may have a policy that imposes the use of fixed and well-known L2/L3 addresses because of authentication and logging reasons. Another example would be to prefer using browser incognito mode when accessing certain sites, or using transport layer security (TLS) by default on certain networks.

Privacy profiles may also be used. In order to provide comprehensive privacy features to (e.g. wireless) internet users, a contextual configuration of the protocol stack may be employed. Features may be enabled (or disabled) in different parts of the protocol stack. These features may provide a much better result than when applied in an uncoordinated manner (in which case the results can become counterproductive). Different connectivity scenarios (or profiles) that may be applied to enable/disable different stack privacy features depending on the network context may be used.

Scenarios with different privacy requirements are described in the embodiments herein. These serve as examples to show how context influences the privacy settings for the entire protocol stack.

Connectivity scenarios are described herein. An important piece of context may come from the network to which the WTRU is attached. For example, the privacy context may vary when connecting to a corporate or home network where the access infrastructure is relatively private and trusted, and to a public hotspot at a coffee shop, or even at a known hotel. Connectivity scenarios that are involved in the embodiments described herein include, but are not limited to the following:

(1) A trusted/controlled network: In a corporate or home network, where the access infrastructure is relatively closed and trusted by the end user, it may not be required to randomize the L2 address. In some cases, it may actually be a requirement not to randomize the L2 address nor hide other protocol identifiers (e.g. DHCP), for example, due to authentication or logging purposes. One example is L2-based access filtering at home networks. In this case, a persistent and well-known L2 address (or belonging to a well-known set of addresses) may be used by default. Regarding the Internet Protocol version 6 (IPv6) interface identifier (IID), in this case, and for the same reasons stated above, a persistent and well-known IID may be used. The IID may not be linked to the L2 address (i.e., the mapping should be opaque so an external observer cannot guess the L2 address from the IPv6 IID).

(2) Untrusted/public networks: Untrusted/public networks may refer to networks that are not under the control of the user connecting to them. A reliable trust relationship between connecting user and networks may also not be present. Untrusted/public networks may also refer to networks where the user has to authenticate prior to gaining access to the network (e.g. through a web portal). An example may be a hotspot in a hotel or airport, where the user has to provide some credentials in order to connect. In this case, the L2 address has to be a random one but should be a persistent one during the lifetime of the authentication token (i.e., cannot change before the authentication lifetime expires, as the user may be asked to authenticate again otherwise, possibly requiring purchase of a new connection pass or authentication token). Regarding the IPv6 IID, different approaches may be adopted. If L2 address randomization is properly performed, the IPv6 IID may be based on the L2 address using a 64-bit Extended Unique Identifier (EUI-64) IIDs. In some cases, this may be sufficient (this assumes some kind of coordination between the L2 and the L3 mechanisms). In case this cannot be ensured or additional privacy is required, the IPv6 IID may be random, which may change even if the user comes back to the same subnet (so an observer cannot track a user coming back to a previously visited network).

(3) Untrusted/public open networks: An untrusted/public open network may be defined as a network where there is no user authentication, with the network being completely open for use by any WTRU. In this case, the L2 address may be randomized on each association to an AP of the same Extended Service Set Identification (ESSID). DHCP identifiers such as "client ID" and "hostname" may be anonymized. The IPv6 IID may also be randomized and opaque to the L2 address, being different every time the user changes networks, even if the user comes back to a previously visited one.

The specific WTRU used by a user to access a given service may be important. For example, using a public PC that is shared by many different people may impose additional privacy requirements than using a corporate laptop or a personal PC at home. Examples of scenarios from the WTRU point of view that are involved in the embodiments described herein include, but are not limited to the following:

(1) Trusted/managed WTRUs: If the user is accessing a given service using a trusted and/or managed WTRU, for example a corporate laptop, the applications may be less strict in the privacy settings they apply. For example, an application may not require protecting against attacks using key loggers. In some examples, a home WTRU is similar, although less secure than corporate equipment, since it not centrally administered by experts with security and privacy expertise and may be shared by all family members. In this case, some applications might prefer not to store certain pieces of information locally or force an "incognito mode" by default.

(2) Untrusted/public WTRUs: If an application knows that it is running on a public PC, it may impose the use of protection mechanisms (e.g., using one-time passwords or two-step authentication, or using a virtual keyboard).

Another dimension to be considered includes application scenarios. For certain applications, disclosing some information may not be critical (e.g., corporate applications), while for other applications, it may be desirable to increase privacy when using them (e.g., social networks). Of course, the importance of the application used has to be linked with other pieces of context, such as the WTRU, and the network (e.g., a corporate application might require more privacy protection when running outside the corporate network).

The methods that may be enabled at each layer of the protocol stack may be combined in different ways depending on the context and preferences of the different actors involved. The term "context" is used to refer to the information that may be used to take a decision at a given place and time for a given user and service. The following are examples of "context":

(1) Visible networks, which may be defined as networks that the WTRU may potentially connect to at that time and place.

(2) (Geo-)location, which may be obtained by a global positioning system (GPS), a Wi-Fi network, maps, or the like.

(3) Information provided by the network, i.e., based on Generic Advertisement Service (GAS)/Access Network Query Protocol (ANAP) or generic 802.11 beacons.

(4) Accounts used to log in by the user.

(5) Connections or information form social networks. For example, a user may decide to trust a given network based on the trust that her friends have. Authorization to access this network (including the required credentials) may also be set-up based on social networking relationships.

(6) Protocols and/or mechanisms supported by the network. This may be used as context information and/or as a limiting aspect to decide which possible configuration may be used at a given time at each layer.

The above list is not intended to be exhaustive or limiting in any manner and is provided just as an example.

The term "actors" refers to the entities that may trigger an action or take an active decision maker role when selecting the privacy mechanisms to be used. The following are examples of "actors":

(1) A user. The preferences and actual indications of the user should be taken into consideration. Depending on the privileges of the user, these indications may override any other automatic decision/configuration.

(2) The administrator of the equipment of the user/account. The administrator might set up policies and/or preferences about how to configure the protocol stack depending on the context.

(3) The administrator of the network. Similar to the administrator of the equipment of the user/account example above, the administrator of the network used to obtain access by the device might indicate some privacy policies.

(4) The application. Applications may provide a set of requirements or policies regarding their privacy preferences. These may be used directly by the system to automatically configure it or to provide the user with additional information to be considered to select an actual privacy set-up.

The above list is not intended to be exhaustive or limiting in any manner and is provided by way of example.

Methods and apparatuses for protocol stack extensions providing a context-aware protocol stack that flexibly enables privacy protection depending on the environment (e.g., context) and different preferences (e.g., user's, admin's, network's, and the like) are described herein. The methods and apparatuses described herein not only address the network connectivity in a static manner, but they also provide a framework that provides a fully configurable, flexible and dynamic protocol stack configuration that may provide different levels of privacy. Privacy and security may be provided at different layers of the protocol stacks. This may be accomplished by enabling different features at different layers of the protocol stack, with the goal of making the behavior of the whole system (e.g., from PHY to APP layers) suit a given set of privacy requirements.

Providing privacy and security to a user when accessing a service may not be the responsibility of one single layer of the protocol stack. The methods and apparatuses described herein address many different aspects of privacy and security in many different ways, are flexible, and address different use cases because not all the situations/use cases may require the same type of actions.

Figure 2A:
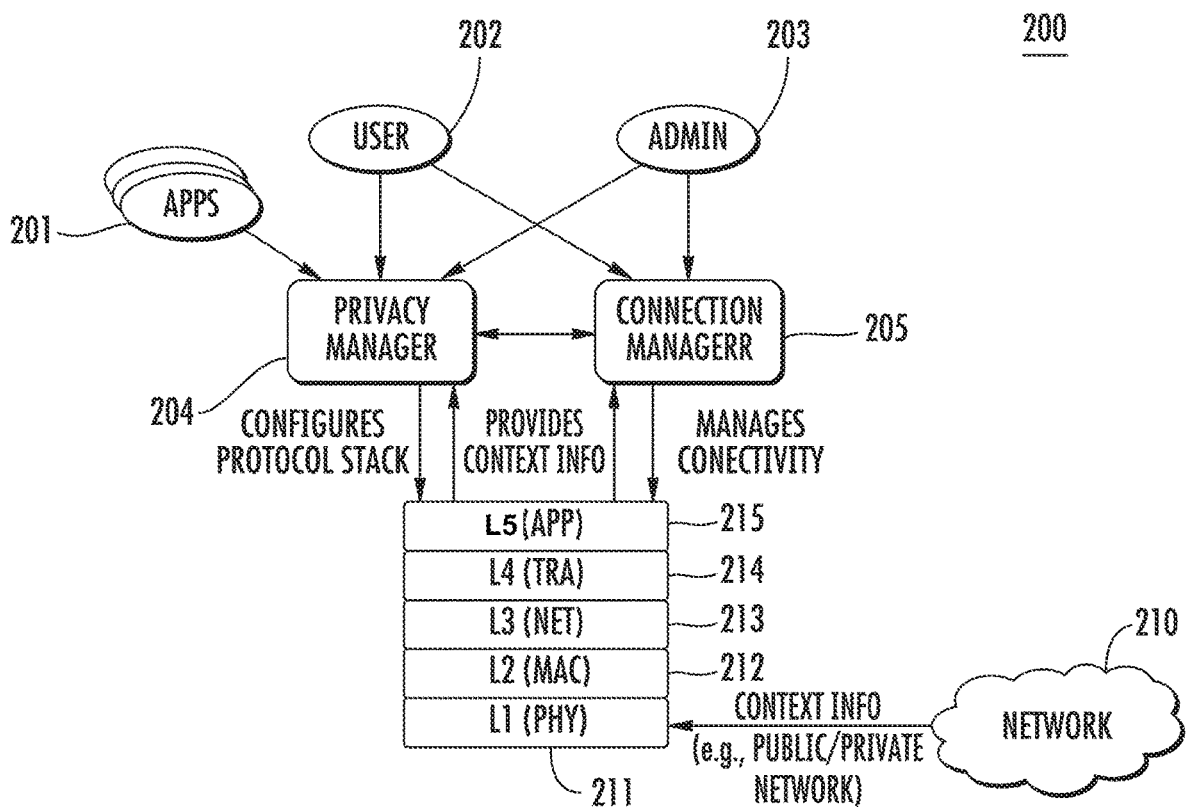
FIG. 2A is a diagram of an example context-aware privacy protocol stack architecture and application programming interfaces (APIs) enabling privacy protection in accordance with one embodiment.

Methods and apparatus for managing privacy by taking context and preferences into account are described herein. FIG. 2A is a diagram of an example context-aware privacy protocol stack architecture and application programming interfaces (APIs) 200 enabling privacy protection in accordance with one embodiment, which may be used in combination with any of the embodiments described herein. The actors involved in the example of FIG. 2A include the applications 201, the user 202, and the administrator 203.

The example of FIG. 2A also shows the configurations that may be performed at each layer of the protocol stack including but not limited to the following examples:

Physical layer (L1/PHY) 211: At this layer, methods such as encryption may be used. Profiling based on passive monitoring may also be minimized by randomizing parameters that may be changed at each connection. Examples of randomization at L1 that may make it more difficult to conduct WTRU profiling include but are not limited to: not always using or preferring to use the same technology/frequency (e.g., 802.11a vs 802.11g) when connecting to a multi-technology/band access point, changing the preferred rates negotiated when establishing the connection, and the like.

Link layer (L2/MAC) 212: At this layer, the L2 (MAC) address may be randomized, encryption at L2 may be used (e.g., WPA/WPA2), authentication may be used, untrusted or non-encrypted networks may be black listed, active scanning may be minimized, and the like.

Network layer (L3/NET) 213: At this layer, the L3 address (IP address) may be randomized, internet protocol security (IPsec) may be used, a virtual private network (VPN) may be used, parameters used for DHCP signaling may be anonymized, and the like. For example, the DHCP identifiers, such as hostname of client ID may be anonymized or randomized.

Transport layer (L4/TRA) 214: At this layer datagram transport layer security (DTLS), TLS, other variations of TLS, TCP security, UDP security, secure sockets layer (SSL), and the like may be used.

Application layer (L5/APP) 215: At this layer Domain Name System Security Extensions (DNSsec) may be used, application privacy methods such as "incognito mode" (e.g. not using previously stored cookies, nor storing any upon exit, and/or not storing browsing history) and other restrictions on cookies may be used, connections between apps and social networks may be prevented, updating a status at given locations by wearable WTRUs may be blocked, HyperText Transport Protocol Secure (HTTPS) (based on transport layer security) may be used, valid web certificate use may be enforced, and the like.

FIG. 2A also shows the interactions among each entity. The privacy manager 204 and connection manager 205 may reside on a WTRU of the user. Alternative locations (e.g. on a dedicated secure server/cloud) are also possible, as long as the connection between the different layers of the protocol stack, the connection manager, and the privacy manager are properly secured. It should be noted that the privacy manager 204 may be a logical construct used to host the intelligence required to coordinate the privacy features of the protocol stack and collect context information from the different actors. The methods and apparatuses described herein may also apply to other kinds of solutions not involving a privacy manager 204 but still offering the same kind of functionality.

Applications 201 may indicate application preferences to the privacy manager 204. The user 202 may configure user preferences with the privacy manager 204 and connection manager 205. The administrator 203 may configure policies with the privacy manager 204 and connection manager 205. The privacy manager 204 and connection manager 205 may synchronize policies. The privacy manager 204 also may configure the protocol stack, and the protocol stack may provide context information to the privacy manager 204. The connection manager may manage connectivity with the protocol stack. The network 210 may provide context information such as public or private network information to the protocol stack.

The privacy manager 204 may offer different privacy profiles to the user 202, each implying different sets of configurations at each layer of the protocol stack. These profiles depend on the context, i.e. some profiles may only be available under certain scenarios and/or may behave differently based on the context. Each profile may contain a specific set of preferred (or default) parameters, avoiding the manual intervention of less technical users that may not be aware of the privacy risks that exist in each specific context. The privacy manager may automatically select a default privacy profile to be used and may offer the privacy profiles available to the user, which may select a different one.

Context-based privacy address configuration mechanisms may also be used in the architecture described above. The privacy address configuration mechanisms described herein may allow users to manually override any automatic decisions, for example by selecting a type of address generation that is to be used. The level of granularity may be all the contexts or specific contexts.

A context-based privacy address configuration may be based on an automatic selection of the type of privacy address generation scheme. The scheme may adapt to the context of the device in order to provide the required flexibility to meet all the requirements imposed by the privacy concerns of the user (i.e. user preferences) and by the potential operational constraints imposed by the specific network context.

The following are some non-limiting example methods for context-based privacy address configuration based on manual configuration/profiles:

(1) In one example method, a user may configure the type of L2 address and IPv6 IID that should be used based on pre-defined user profiles. For example, the L2 address and IPv6 IID configuration may be part of the configuration actions associated with the "public," "work," or "home" profiles of a PC desktop or portable PC laptop, or smartphone. In general, this may be part of the configuration actions associated with a network on a connection manager. The context may be linked, for example, to the extended basic service set ID (ESSID) or basic service set ID (BSSID) of the network (WiFi in this example), to the authentication used to gain access, to the presence of specific nodes in the network (i.e. by probing their presence), by geo-location (e.g. GPS-based or network assisted based on WiFi network maps), and the like.

(2) In another example method, the user may manually configure a context through a specific input from an application or web browser. If the user specifies that the user wants to establish a private session in a specific network, the application/browser may signal the rest of the protocol stack (and/or the network) that the user desires to perform a private session. In this case, new private addresses may be generated, and new encryption keys may also be used to support this private session connectivity. Other options may also be selected and deployed.

Context-based privacy address configuration may also be based on information provided by a trusted entity of the network (e.g. a local entity or a central entity). For example, information available on the generic advertisement service (GAS), the access network query protocol (ANQP), or generic 802.11 beacons, may be used to automatically decide which privacy address generation scheme may be used. Similarly, the device may consult trusted repositories or policy databases (e.g., the access network discovery and selection function (ANDSF)), and dynamically learn what to do which may include but is not limited to determining which context to apply.

Context-based privacy address configuration may also be based on information provided by auto-configuration mechanisms, including but not limited to DHCP, neighbor discovery (e.g., based on information contained on router advertisements), point-to-point protocol (PPP), domain name server (DNS), and the like. In this case, some level of trust with the network element may exist in order to apply the policies recommended via these mechanisms. Otherwise, any network node may have a negative impact on the privacy address scheme used by the device.

In any of the examples described herein, in which the device does not know which approach to use before gaining connectivity, the device may follow a default conservative approach when first attaching to the network, such as setting up a private session. For example, the device may use a randomized L2 address and a random and opaque IPv6 IID, and then may re-configure if a different scheme is required. It should be noted that this default conservative approach may also be configurable and different approaches may be used depending on some existing context information. For example, if the device is aware that a captive portal is being used to complete some user authentication, the device may know that the randomized L2 address may need to be persistent on that network at least during the lifetime of the authentication performed by the user. The lifetime of this connection may be indicated by the network or manually configured by the user.

In the case of Wi-Fi networks (and similar wireless local area network (WLAN) and wireless personal area network (WPAN) technologies), the former considerations mainly affect the L2 address generation for association and authentication with an access point (AP) and the subsequent data transmission.

For active scanning (based on sending probe requests), similar considerations may be applied, defining context-based approaches.

(1) Different L2 addresses for active scanning may be used depending on the association state of the device. For example, a device may decide to use a different L2 address or the same L2 address that is used with its current AP when associated. Similarly, a device may use random L2 addresses when scanning only without being associated to any AP. This may be personalized depending on the context.

(2) Depending on the context, a device may decide to proactively scan (i.e. send probe requests) to all known networks, to known networks at the current location (e.g. based on geo-location), or to omit specific networks from the active scanning. It should be noted that active scanning for previously known networks may also provide information to track a user, as BSSIDs and ESSIDs are included in the active probe measures.

(3) Context detection may be based on location, surrounding networks, time of the day, applications being used, network indication, manually configured by the user, or a combination thereof.

Another protocol interaction that poses privacy concerns is IP configuration via DHCP. For example, DHCP clients include the "hostname" or "client ID" in the DHCP exchange, so the server can perform updates on the DNS on behalf of the clients. The inclusion of the "hostname" in DHCP signaling is an example of a privacy leak that may be prevented. Therefore, similar to the scenarios described before, the protocol stack may make use of the privacy context to decide whether or not to include parameters such as the "hostname" or "client ID" in the DHCP signaling.

Likewise, higher protocols may benefit from the privacy context definition. For instance, publishing an IP address and hostname in the DNS (registry), HTTP cookies, and in general unencrypted web browsing, especially when using social networks, may be done differently when operating in a private context. Several protocol layers may make use of the privacy context to decide whether to include sensitive information or not.

Figure 2B:
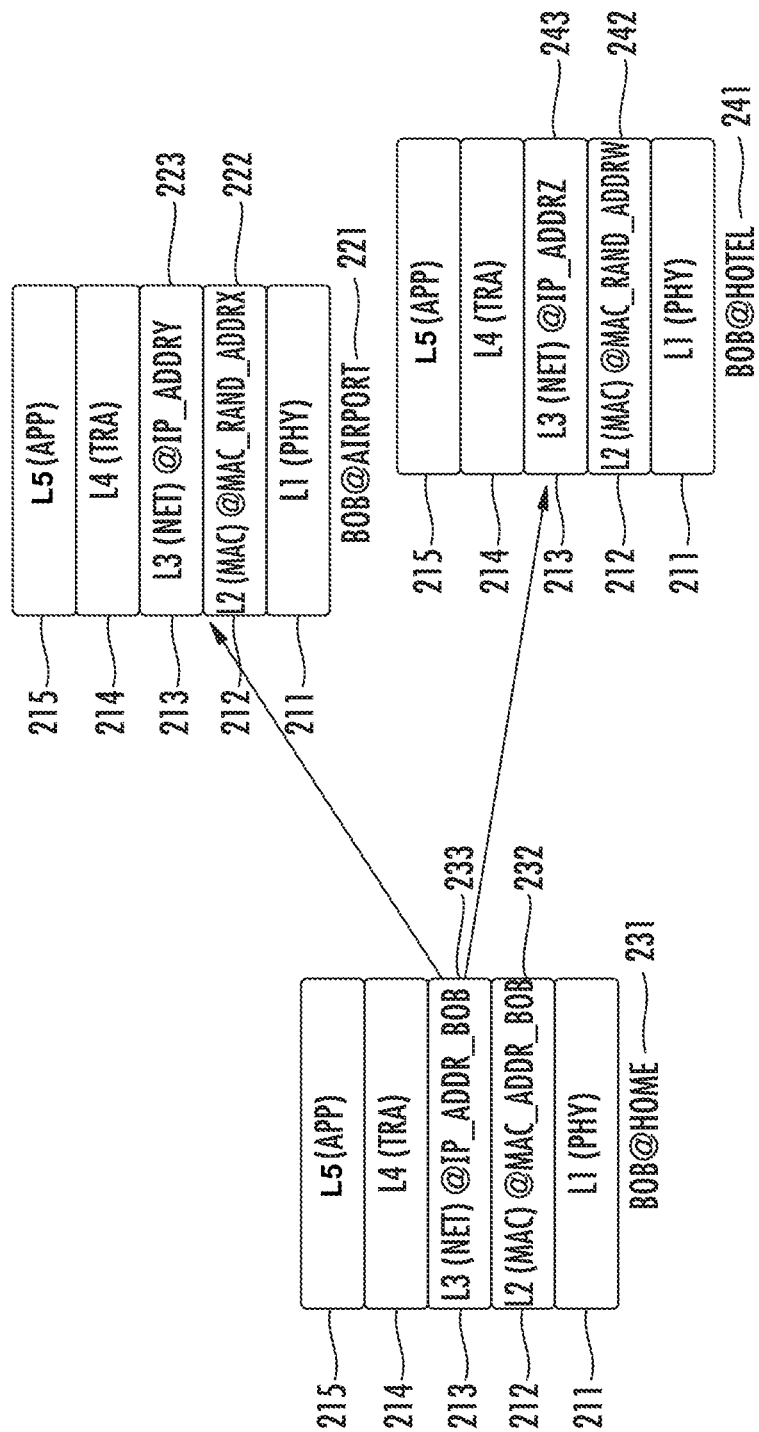
FIG. 2B is a diagram of an example privacy context-based protocol stack enabling context-based privacy configuration of addresses and other protocol identifiers and parameters.

FIG. 2B is a diagram of an example privacy context-based protocol stack enabling context-based privacy configuration of addresses and other protocol identifiers and parameters. FIG. 2B provides examples of the API interaction at each layer of the protocol stack L1 (PHY) 211, L2 (MAC) 212, L3 (NET) 213, L4 (TRA) 214, and L5 (APP) 215. Addresses may be locally managed and configured based on the type of network detected and information received about the network. In the example of FIG. 2B, if the device recognizes that it is at a public or unknown location, the profile may be set to a public network, such as Bob@Airport 221 indicating a public network. The MAC address may be set to random, opaque and non-persistent, as shown by @MAC_rand_addrX 222. Similarly, the IP address may be set to random, opaque and non-persistent as shown by @IP_addrY 223.

Another example may be a profile used when connecting to the corporate network of the user or the home network of the user, in which permanent and well known L2/L3 addresses are used (often to authenticate the user/WTRU) and end-to-end security may be established by default at the network or transport layer. In the example of FIG. 2B, if the device knows that it is at home (e.g. by geolocation), the profile may be set to home, such as Bob@Home 231 indicating a home network. The MAC may be set to permanent and well-known, as shown by @MAC_addr_Bob 232. The IP address may be set to permanent and well-known, as shown by @IP_addr_Bob 233.

In another example, a profile may exist for an untrusted public network such as the one deployed in a hotel. This profile may select a random L2 (random MAC address) address for the initial connection (so no association of the identity of the user may be performed based on observing the used addresses), select random identifiers when using DHCP to acquire the IP configuration, and avoid any dynamic update of DNS while attached to this network. For example, the DHCP identifiers, such as hostname or client ID may be anonymized or randomized. On the upper layers, the privacy manager might offer the user different options regarding the use of cookies, for example entering a privacy mode by default. In the example of FIG. 2B, if the device knows it is at an untrusted network where a persistent identifier may be required (e.g. for authentication) the profile may be set to authenticated hotspot, such as Bob@Hotel 241 indicating an untrusted network where a persistent identifier may be required. The MAC address may be set to random, opaque, but not persistent, as shown by @MAC_rand_addrW 242. The IP addresses may be set to random, opaque, but not persistent, as shown by @IP_addrZ 243.

Figure 3:
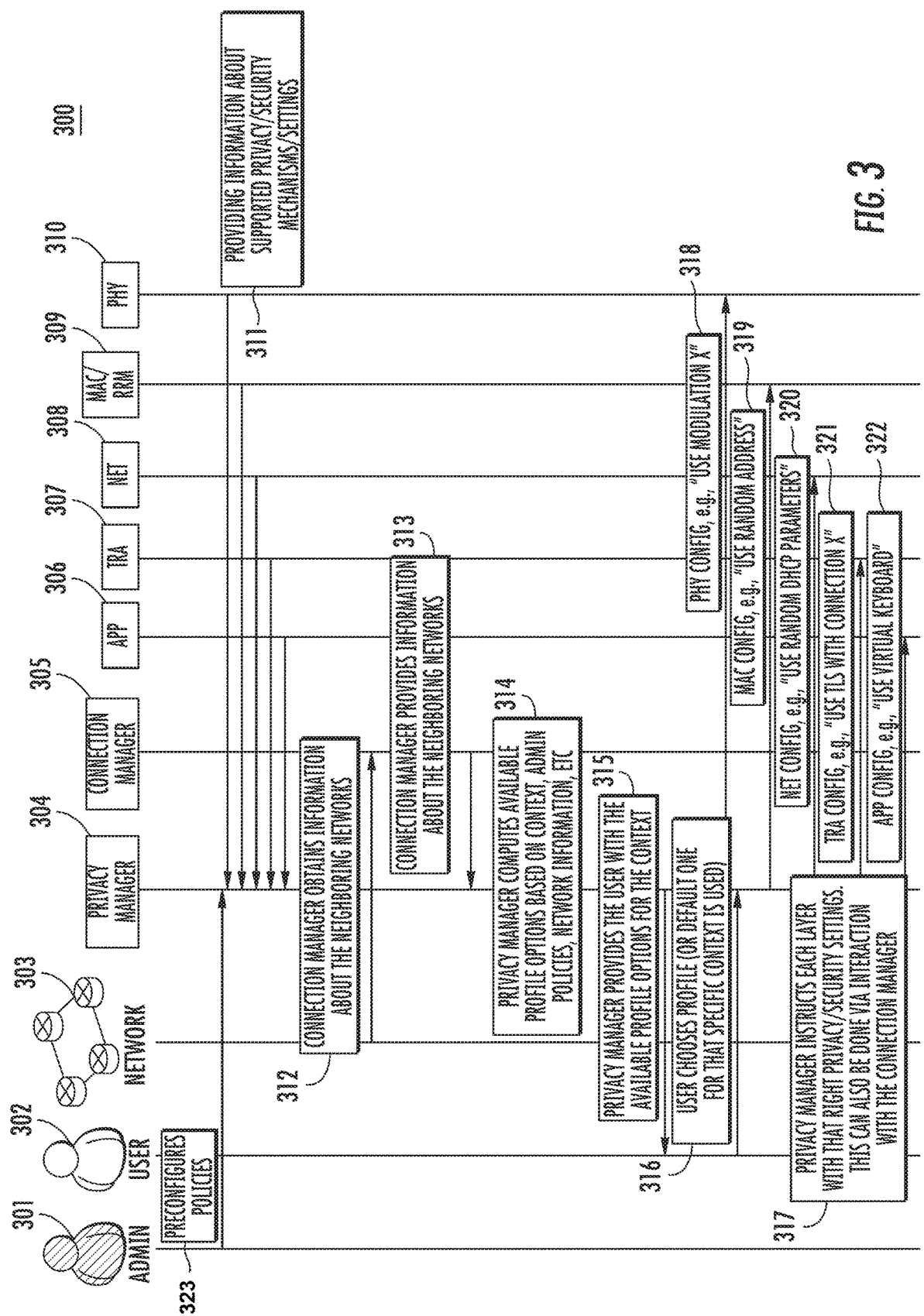
FIG. 3 is a signaling diagram of an example operation using a context-based protocol stack.

FIG. 3 is a signaling diagram of an example operation using a context-based protocol stack 300. In the example of FIG. 3, a WTRU 302 of a user is about to attach to a network 303. Prior to any kind of connection taking place, the administrator 301 of the WTRU may have configured a set of default policies/preferences, which may then be taken into account when configuring the protocol stack. Referring to FIG. 3, different actors are shown: the WTRU 302 of the user, the administrator 301 (admin) of the user's equipment (the administrator 301 may be the user itself, for example, in the case of a home computer), the network 303, privacy manager 304, and connection manager 305. The different layers of the protocol stack are also shown: L5/APP 306, L4/TRA 307, L3/NET 308, L2/MAC/RRM 309, and L1/PHY 310.

In the example of FIG. 3, prior to any kind of communication, the administrator 301 may pre-configure policies 323 on the privacy manager 304 (e.g., (1) always use VPN when outside the corporate network with L2/L3 address randomization, (2) use well known L2/L3 addresses when connecting within the corporate network, and the like). In each connectivity scenario, the different layers of the protocol stack, L5/APP 306, L4/TRA 307, L3/NET 308, L2/MAC/RRM 309, and L1/PHY 310, may provide to the privacy manager information about supported privacy and security mechanisms and settings 311 (e.g. L2 address randomization support, IPsec support, etc.). The connection manager 305 may obtain information about neighboring networks 312. The connection manager 305 may then provide the information about neighboring networks to the privacy manager 313. Other context information (such as geo-location for example) may also be used by the privacy manager at this stage.

With the context information, the privacy manager 304 computes available profile options based on context, administration policies, network, information, etc. 314, and may take into consideration the limitations and preferences of the different involved actors. The privacy manager 304 may then provide the user (WTRU 302) with the available profile options for the context 315. The user (WTRU 302) may then choose a profile or a default profile for that specific context that may be used if the user (WTRU 302) does not select any specific profile 316. Additionally or alternatively, the privacy manager 304 may decide independently the profile to be applied in this specific context without interacting with the user. Then the privacy manager 304 may then instruct each layer of the protocol stack with the right privacy and security settings as specified by the chosen profile 317, which may be done via interaction with the connection manager 305. It should be noted that a profile may imply different privacy settings at different layers (e.g., "use incognito mode when browsing foo.net or any new site, but not when browsing company.com"). As shown in FIG. 3, the privacy manager 304 may instruct an L1/PHY configuration, such as "use modulation x" 318. The privacy manager 304 may instruct an L2/MAC configuration, such as "use random address" 319. The privacy manager 304 may instruct an L3/NET configuration, such as "use random DHCP parameters" 320. The privacy manager 304 may instruct a L4/TRA configuration, such as "use TLS with connection X" 321. The privacy manager 304 may instruct an L5/APP configuration, such as "use virtual keyboard" 322.

Figure 4:
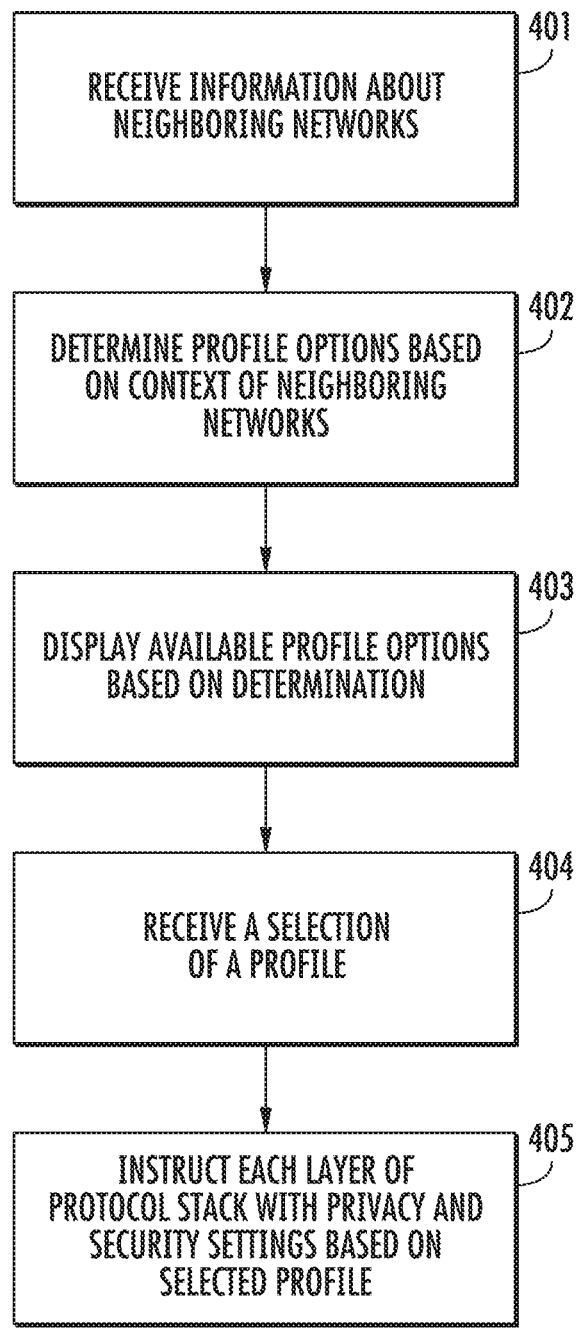
FIG. 4 is a flow diagram for an example procedure 400 for use in the privacy manager.

FIG. 4 is a flow diagram for an example procedure 400 to enable selection of a profile such as a privacy profile for use in the privacy manager, which may be located within a WTRU and may be used in any of the embodiments described herein. The privacy manager within the WTRU may receive information about neighboring networks 401. This information may be sent by the connection manager or be sent from another network source and received by a receiver or transceiver of the WTRU. The privacy manager within the WTRU may then determine privacy profile options based on the context of the neighboring networks 402. This determination may be computed by a processor of the WTRU. The privacy manager within the WTRU may then display available privacy profile options based on this determination 403 in order to enable a user to view and select available privacy profile options. The available privacy profile options may be displayed on a display device of the WTRU. The privacy manager within the WTRU may then receive a selection of a privacy profile 404. The selection may be received from an input from the user of the WTRU. Alternatively, the privacy manager may determine the privacy profile selection, for simplicity or convenience to the user, or based on a policy and guidelines of the policy. The privacy manager within the WTRU may then instruct each layer of the protocol stack with privacy and security settings based on the selected privacy profile 405. The selected privacy profile may include a different configuration at each layer of the protocol stack. The privacy and security settings instructions may be transmitted via a transmitter or transceiver of the WTRU or sent to another entity within the WTRU that has an interface to the network. The instructed privacy and security settings may be based on any of the examples described herein.

In another example, the user may select a network and adjust a privacy profile based on the selected network. In this procedure, the privacy manager within the WTRU may receive information about neighboring networks. This information may be sent by the connection manager or be sent from another network source and received by a receiver or transceiver of the WTRU. The privacy manager within the WTRU may then select a network from the plurality of networks. This selection may be based on a determination by a processor of the WTRU. The privacy manager within the WTRU may then adjust a privacy profile based on the context of the selected network. The context may be based on the received information associated with the selected network. The privacy manager within the WTRU may then instruct each layer of the protocol stack with privacy and security settings based on the adjusted privacy profile. The privacy and security settings instructions may be transmitted via a transmitter or transceiver of the WTRU or sent to another entity within the WTRU that has an interface to the network. The instructed privacy and security settings may be based on any of the examples described herein.

The embodiments described above support various use cases. In an example use case, a user may use her work laptop and personal phone, both equipped with the privacy mechanism described herein. Three exemplary locations (showing different contexts) may be considered:

(1) In a first location, the user is working on a customer side. There, the privacy manager on her work laptop automatically sets up a default privacy profile, considering the context information (e.g., not at the home office network) and the administrator policies. The default profile may require using L2 encryption (if available at the connected network), L2 address randomization, and use of L3 VPN to the home office. A second privacy profile may be made available, which does not use L3 VPN with the home office for all traffic, but only for traffic associated with company applications (e.g., e-mail) and/or addressed to servers at the company network. On the personal phone, based on the context, the privacy manager may offer different privacy profiles to the user, all of them providing a minimum level of privacy, but offering different options, leaving the final selection to the end user. For example, all the profiles made available to the user may imply L2 and L3 address randomization, but use of VPN tunneling back to home may be optional, as well as use of incognito browsing.

(2) In a second location, the user is at a hotel. There, the privacy manager on the work laptop may offer the same profiles as in the previous location, plus an additional profile allowing the user access to non-company related applications, but forcing the use of the browser "incognito" mode. On a personal phone, the privacy profiles that are made available to the user may offer an increased level of privacy and security, for example minimizing the active scanning activity to reduce the impact of passive monitoring activities that may be taking place at the hotel network. In both the work laptop and personal phone, the L2 address randomization may be performed in such a way that the randomized address may not change during the time the user stays at the hotel (or, more precisely, at least the time the Internet connection at the hotel is bound to a given L2 address) to avoid the user becoming disconnected with the hotel network as a result of a change of L2 address.

(3) In a third location, the user is at home. This location is associated with a similar context as in the hotel from the point of view of the administrator of the work laptop (i.e., the laptop is outside the company network), so the same privacy profiles are offered to the user. However, on the personal phone, since the user trusts her home and may have access mechanisms in place based on the L2/L3 addresses, L2 and L3 address randomization may be disabled.

The above description is an example demonstrating how the profiles may change between WTRUs and locations (and available networks). Depending on the context and involved actors, different situations may take place.

As described above, the profiles offered to the user may be dynamically computed based on the context information (e.g., current location, account used to log in, network connectivity, capabilities of the protocol stack layers, and the like) and the preferences/limitations imposed by the involved actors. These profiles imply actions that may affect each protocol stack layer, e.g., not only being restricted to L2/L3. The privacy manager may not offer the same set of predetermined profiles to every user at any location, but rather may take into account context and actors' preferences to generate a customized set of profiles dynamically and/or automatically.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU), the method comprising:
    selecting a privacy profile, wherein the privacy profile includes privacy and security settings for each layer of a protocol stack of the WTRU, wherein the privacy and security settings include at least one of (1) using anonymous dynamic host configuration protocol (DHCP) signaling parameters, the anonymous DHCP signaling parameters including a hostname, (2) using a non-static medium access control (MAC) address, and (3) using a non-static Internet protocol (IP) address; and
    instructing each respective layer of the protocol stack of the WTRU with the privacy and security settings based on the selected privacy profile.

2. The method of claim 1, wherein the privacy and security settings include using non-static dynamic host configuration protocol (DHCP) signaling parameters.

3. The method of claim 2, wherein the non-static DHCP signaling parameters include a hostname.

4. The method of claim 1, wherein the selected privacy profile includes a different configuration at each layer of a protocol stack.

5. A wireless transmit/receive unit (WTRU), the WTRU comprising:
    a processor configured to select a privacy profile, wherein the privacy profile includes privacy and security settings for each layer of a protocol stack of the WTRU, wherein the privacy and security settings include at least one of (1) using anonymous dynamic host configuration protocol (DHCP) signaling parameters, the anonymous DHCP signaling parameters including a hostname, (2) using a non-static medium access control (MAC) address, and (3) using a non-static Internet protocol (IP) address; and
    a transmitter configured to transmit instructions to each respective layer of the protocol stack of the WTRU with the privacy and security settings based on the selected privacy profile.

6. The WTRU of claim 5, wherein the privacy and security settings include using non-static dynamic host configuration protocol (DHCP) signaling parameters.

7. The WTRU of claim 6, wherein the non-static DHCP signaling parameters include a hostname.

8. A method for use in a wireless transmit/receive unit (WTRU), the method comprising:
    selecting a network from a plurality of networks;
    adjusting a privacy profile wherein the privacy profile includes privacy and security settings for each layer of a protocol stack of the WTRU, wherein the privacy and security settings include at least one of (1) using anonymous dynamic host configuration protocol (DHCP) signaling parameters, the anonymous DHCP signaling parameters including a hostname, (2) using a non-static medium access control (MAC) address, and (3) using a non-static Internet protocol (IP) address; and
    instructing each respective layer of the protocol stack of the WTRU with the privacy and security settings based on the adjusted privacy profile.

9. The method of claim 8, wherein the privacy and security settings include using non-static dynamic host configuration protocol (DHCP) signaling parameters.

* * * * *